May 12, 1936. H. G. ROGERS 2,040,533
PARACHUTE HARNESS
Filed Feb. 20, 1932 4 Sheets-Sheet 1

INVENTOR.
Harold G. Rogers
BY Lancaster, Allwine and Rommel
ATTORNEYS.

May 12, 1936.  H. G. ROGERS  2,040,533
PARACHUTE HARNESS
Filed Feb. 20, 1932  4 Sheets-Sheet 2

INVENTOR.
Harold G. Rogers
BY
ATTORNEYS.

May 12, 1936.   H. G. ROGERS   2,040,533
PARACHUTE HARNESS
Filed Feb. 20, 1932   4 Sheets-Sheet 4

INVENTOR.
Harold G. Rogers

Patented May 12, 1936

2,040,533

UNITED STATES PATENT OFFICE 2,040,533

PARACHUTE HARNESS

Harold G. Rogers, Buffalo, N. Y., assignor to Irving Air Chute Company, Inc., Buffalo, N. Y., a corporation Application February 20, 1932, Serial No. 594,305

18 Claims. (Cl. 244—21)

This invention relates to improvements in parachute harness adapted to support an individual during the making of a parachute descent.

The primary object of this invention is the provision of an improved parachute harness which partakes of some of the features of the orthodox type of parachute harness, particularly insofar as the same utilizes a sling for supporting the rider during descent, but which includes a relatively simple and efficient arrangement of body encircling and limb attaching straps which will enable the rider to be safely and comfortably secured within the harness.

A further object of this invention is the provision of an improved parachute harness which is capable of being adjusted to individual stature; embodying improved means to enable a quick and efficient adjustment upon the individual in a comfortable and safe-fitting relation.

A further object of this invention is the provision of an improved parachute harness for individuals which embodies an improved arrangement of straps for securing the supporting swing upon the individual in such manner that the leg and arm receiving loops of the harness are interadjustably associated. In the orthodox or standard type of harness now in use the body attaching straps have no adjustment along the conventional U-shaped sling support at the hip of the wearer. For that reason upon large individuals the hip connection of the leg strap on the upright of the sling is too low, and for a small individual it is too high. The improved harness overcomes the disadvantage by reason of the fact that the hip connection is adjustable along the sling uprights in order to properly transmit the weight of the load to the sling and add to the comfort and safety of the wearer. Also in the conventional harness most of the load is transmitted to the leg connecting straps on individuals of large or small stature, but in the improved harness the hip attachment is adjustable so that the sling is pulled properly into place upon the wearer to receive the load and properly support the wearer during descent.

A further object of this invention is the provision of an improved parachute harness adjustment which is adaptable for use upon either the three-point connector type of harness or the single release connector harness.

Other objects and advantages of this invention will be apparent during the course of the following detailed description.

In the accompanying drawings, forming a part of this specification, and wherein similar reference characters designate corresponding parts throughout the several views, Figure 1 is a perspective view of the improved harness which partakes of some features of the orthodox or standard type of harness now in use throughout the world, in that the same includes a supporting sling and a three-point body connection, but which includes improvements over the orthodox harness in the manner in which the body attaching straps are relatively adjustable, and adjustable upon the sling.

Figure 4:
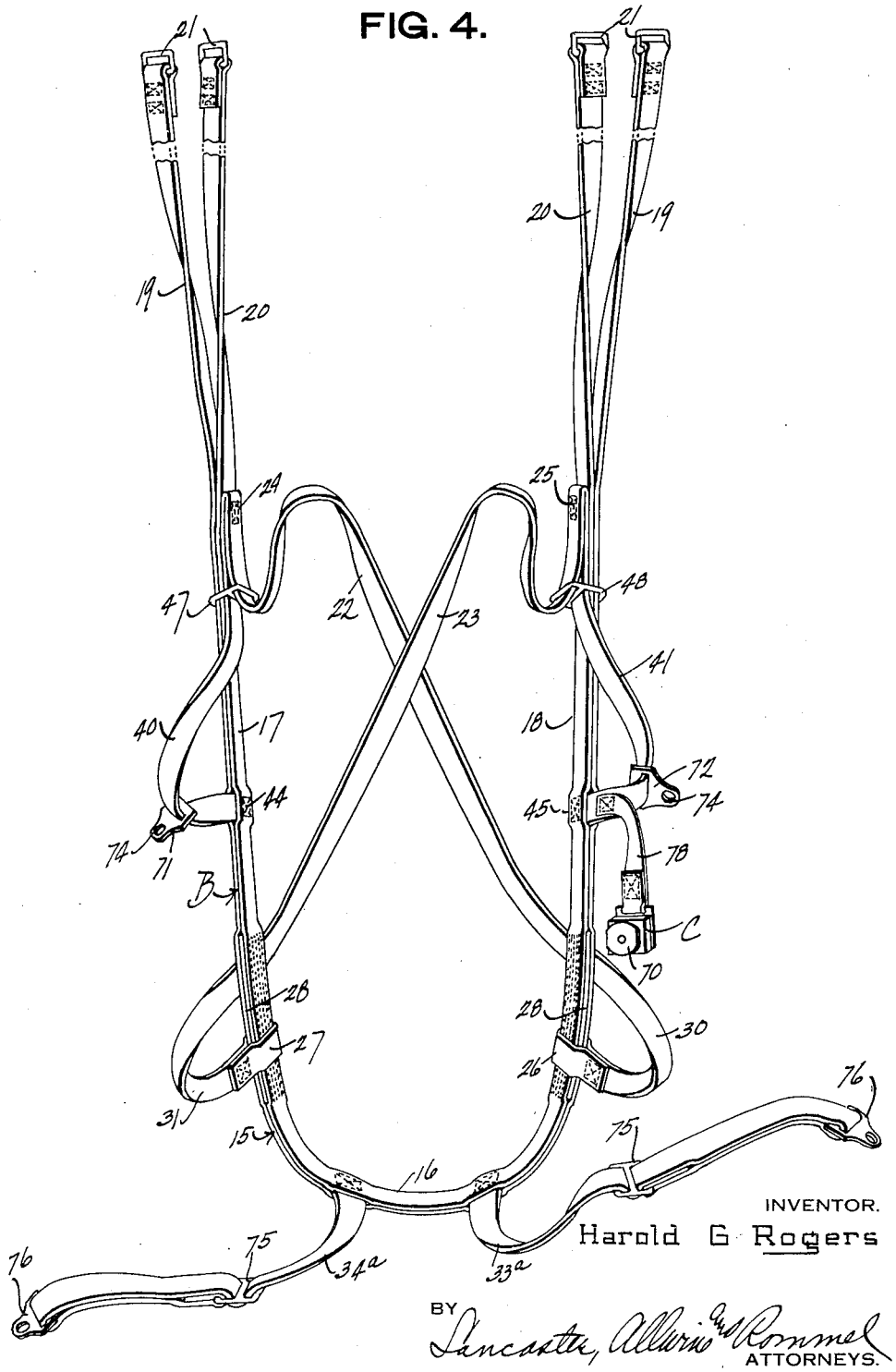

Figure 4 is a perspective view of a single point connector type of harness which partakes of some of the features of the improved harnesses set forth in a copending application Serial No. 481,317, filed September 11, 1929 and U. S. Patent #1,842,611 granted January 26, 1932, but which differs thereover in an improved adjustable connection of the body attaching webs or straps upon the sling of the harness.

Figure 5:
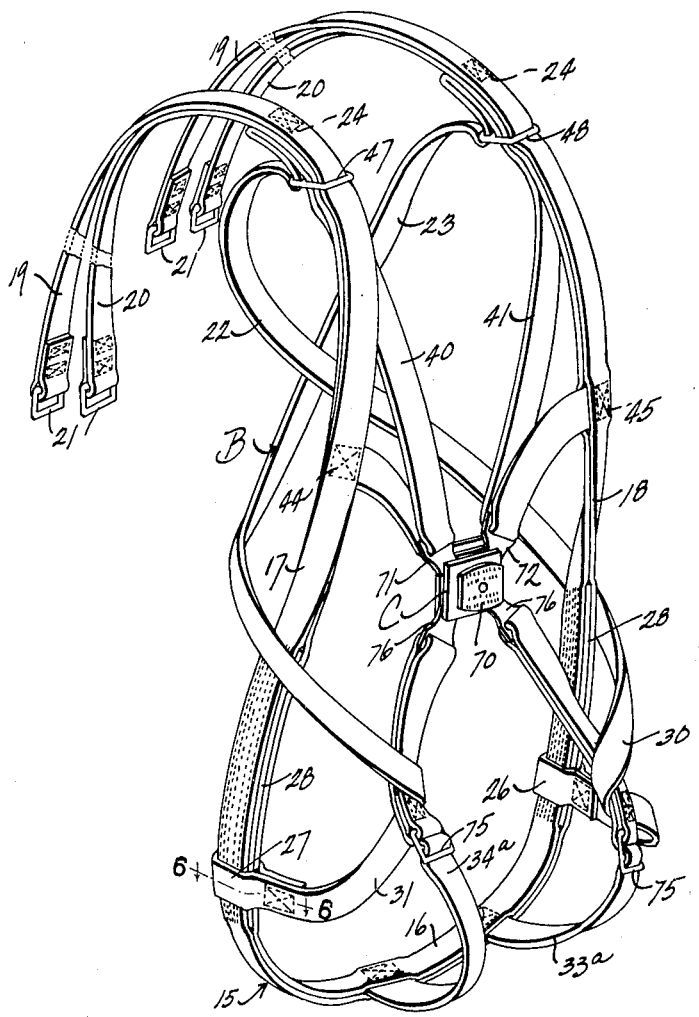

Figure 5 is a perspective view of the harness of Figure 4 in the relation which the parts assume upon a wearer.

Figure 6:
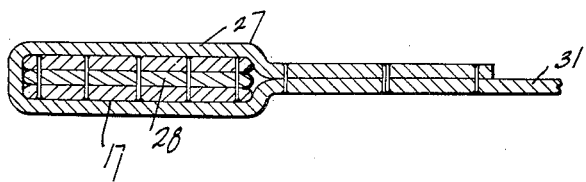

Figure 6 is a cross sectional view taken substantially on the line 6—6 of Figure 5.

In the drawings, wherein for the purpose of illustration are shown several embodiments of the invention, the letter A may generally designate the improved three-point connector type of harness, and B may designate the improved single point connector type of harness.

Both types of harness A and B are similar so far as the arrangement of the main sling, back straps and leg straps are concerned, with the exception of the attaching buckles or connections by means of which the breast, back and leg encircling straps are arranged upon the wearer. So far as the two harnesses A and B are similar the same reference characters have been applied.

The harness straps or webbing are preferably constructed of woven textile flexible linen or other webbing, of high tensile strength, preferably in excess of 2800 pounds. The harness may of course be of other material if desired and should be sufficiently flexible to readily conform with the contour of the wearer, and with comfort.

Conventional parachute harnesses such as now used throughout the world are disclosed in U. S.

Patents Nos. 1,440,151; 1,560,366; 1,367,723, and 1,403,984; the second patent mentioned representing the harness in universal use at the present time. That type of harness, while readily adjustable to wearers of different size, is not always comfortable, and there is not a proper inter-adjustable association of the back, breast, and leg straps necessary to enable the harness to be worn upon the wearer with comfort, so as to enable the wearer to readily move about and stoop or stand upright with assurance that the parts of the harness will fit properly against the body.

The harness of forms A and B preferably consists of a main U-shaped supporting sling 15 including a seat portion 16 and riser or lift web straps 17 and 18. The U-shaped harness sling 15 preferably is constructed by securing together double thicknesses of the webbing which are stitched along the uprights or riser webs 17 and 18 and along the seat portion 16. At a point near or above the location where the riser webs are attached to the shoulders of the wearer, each web 17 and 18 is provided with independent suspension straps or webs 19 and 20, which in reality are nothing but continuations of the two thicknesses which comprise the U-shaped sling 15; the said suspension straps or webs 19 and 20 terminating in D-rings or connections 21 to which the shroud lines of the parachute canopy are attached as in standard construction.

Figure 1:
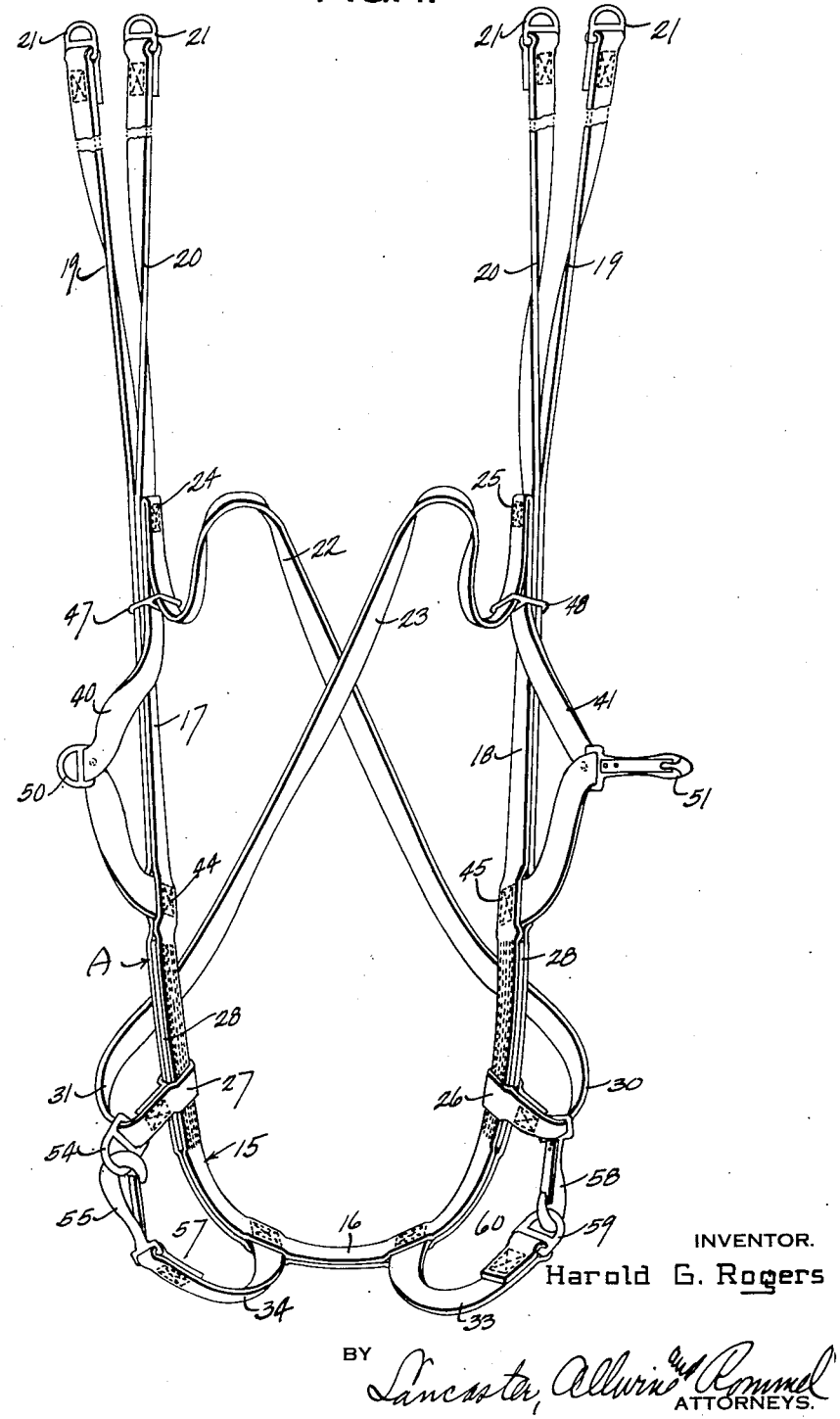

Diagonally crossing back straps 22 and 23 are provided, which are secured respectively at their upper ends by stitching 24 and 25 to the lift webs 17 and 18 immediately at the location from which the suspension webs 19 and 20 extend in a relatively non-connected relation. These back straps 22 and 23 are adapted to extend from in front of the wearer over the shoulders of the wearer, diagonally crossing at the back of the wearer and extending about the sides of the wearer adjacent the hips, crossing externally over the lift webs 17 and 18 above the seat 16, and terminating in slip loops 26 and 27 which have respective connection upon the webs 18 and 17, for vertical sliding along said lift webs; the lift webs at these locations being stiffened somewhat by an insert 28 which is placed between the thicknesses of material making up the U-shaped sling 15, and securely stitched between said thicknesses and to said thicknesses of material, as shown in Figure 1 of the drawings; these portions of the lift webs being thus stiffened to facilitate an easy sliding adjustment of the slip loops 26 and 27 to properly position the slip loops vertically upon the lift webs in conformity to both the stature and posture of the wearer. It is noted that these slip loops 26 and 27 are so placed upon the harness as to loop the straps 22 and 23 at 30 and 31 respectively, at the front of the wearer, forwardly of the lift webs 18 and 17, in a position to facilitate a slip connection of the leg encircling straps 33 and 34 therewith.

The breast strap arrangement consists of straps 40 and 41 connected upon the uprights or riser webs 17 and 18 respectively. The upper ends of said straps 40 and 41 are respectively connected at 24 and 25 to the riser webs 17 and 18; the same in fact being continuations of the back straps 22 and 23 respectively and doubled at the secured areas 24 and 25 and stitched to the two thicknesses of the sling 15, as shown in Figure 1 of the drawings and elsewhere. Intermediate their ends the straps 40 and 41 are twisted, and at their lower ends they are respectively secured at 44 and 45 between the thicknesses of the lift webs 17 and 18, and stitched thereto. Adapters 47 and 48 are slidably mounted upon the lift webs 17 and 18 respectively; the same being provided with openings to slidably receive the respective lift webs therein as well as the upper ends of the straps 22 and 23 and the breast straps 40 and 41. By slipping the adapters 47 and 48 upwardly along the lift webs the size of the harness may be increased to fit a long bodied person, and correspondingly by slipping them downwardly along the lift webs the lengths of the back and breast straps and the loops thereof may be correspondinglyy reduced to fit individuals who are short-bodied. With this arrangement a considerable range of adjustment is obtained.

Referring specifically to the harness A the breast strap 40 is provided with a loop or connection 50 thereon, and the other breast strap 41 is provided with a slidable snap buckle or complementary connection 51 thereon. The breast straps 40 and 41 are extended across the breast of the wearer and the parts 50 and 51 are connected together. The arms and shoulders of the individual are of course slipped in the openings defined by the crossing back straps and the intermediate portions of the lift webs, as is the case with the orthodox type of harness, and the adapters 47 and 48 are adjusted to suit.

The lower forwardly looped portion 31 of the back strap 23 and the outer end of the leg strap 34 are provided with complementary parts 54 and 55 respectively, which may be detachably connected together to provide a leg encircling loop 57. The connector part 54 is freely slidable along the lower end of the back strap 23, so that it may be adjusted along the loop 31 in order to vary the size of the loop opening 57. In similar manner the loop 31 formed at the lower end of the back strap 22 and the free end of the leg strap 33 are provided with complementary connector parts 58 and 59; the connector part 58 being freely slidable along the loop 30 to vary the size of the leg encircling loop opening 60 to suit the size of the leg of the wearer, which may vary, not only as regards the stature of the wearer but also because of different postures which the wearer may assume, as can readily be understood.

Figure 2:
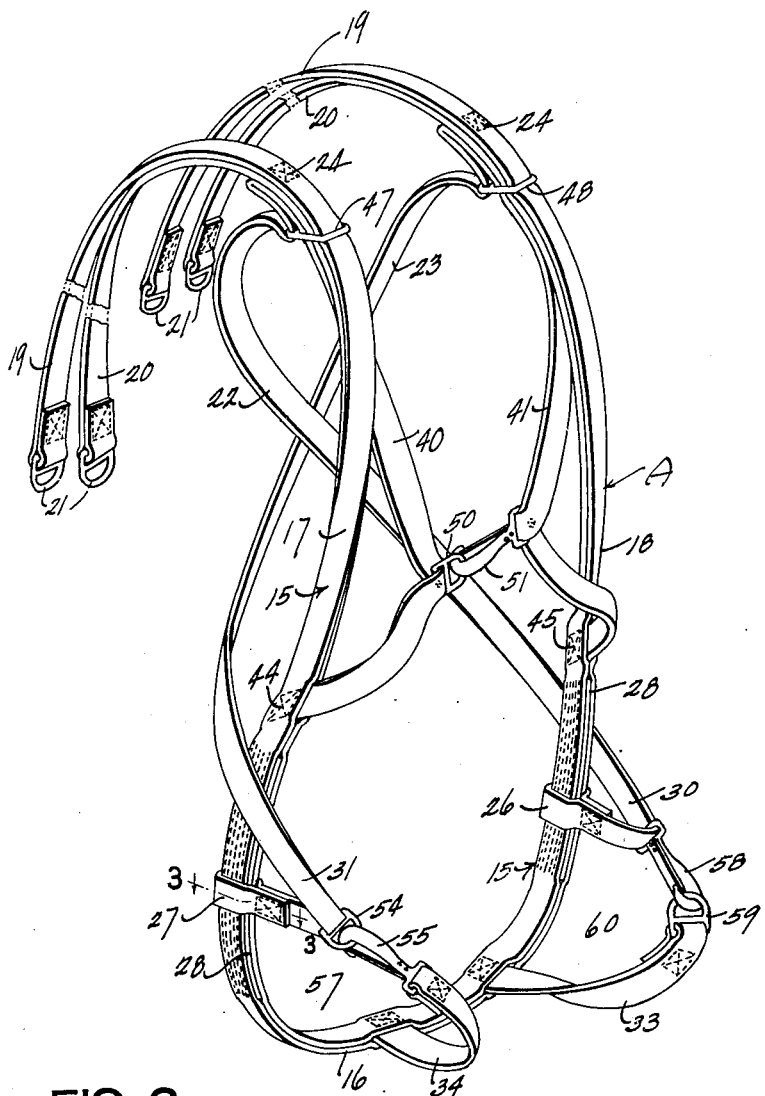
Figure 2 is a perspective view showing the assembly of the improved harness of Figure 1, in the manner in which it is supported upon a wearer.
Figure 3:
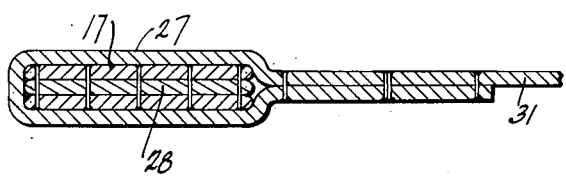
Figure 3 is a cross sectional view taken on the line 3—3 of Figure 2, through a slip loop connection of the harness.

The application of the harness A upon a wearer is shown in Figure 2 of the drawings, and it will be readily noted from that view that the arm and shoulder receiving loop openings of the harness A are inter-adjustable as to size with the leg encircling loop openings; the adjustments being effected not only by reason of the sliding of the connector parts 54 and 58 along the lower end of the back straps, but also by reason of the vertical adjustment of the slip loops 26 and 27 upon the lower ends of the riser webs 17 and 18.

Referring to the type of harness B, the same is of the character more particularly set forth in the co-pending application, Serial No. 481,317 above referred to, and is also of the type set forth in a Patent No. 1,842,611 granted January 26, 1932, in that a single or one-point release mechanism is provided for releasable attachment of the harness upon the wearer. This release mechanism may be operated with facility and safety to permit the wearer to instantly discard the harness without operation of any other couplings or connectors. The one-point release connector is of the type set forth in the co-pending application and recently issued patent above mentioned, and is designated at C in Figures 4 and 5 of the drawings. It is secured to the harness at 18 and has a casing with spring actuated detents therein which may be simultaneously depressed by means of a button arrangement 70 to release all of the complementary connector parts of the harness. Two of these complementary connector parts 71 and 72 are placed upon the breast straps 40 and 41 of the harness B, and are freely slidable thereon; the same having openings 74 therein to receive separate detents of the release mechanism C. The leg straps 33ª and 34ª have their free ends doubled in an adjustable loop whose length is controlled by an adapter 75. Each of these loops slidably receives a connector part 76. The connector parts 76 have independent detents in the release mechanism C.

Referring to Figure 5 it will be seen that the harness B is attached upon the wearer much in the same manner as the type of harness A except that the one-point release mechanism C is placed centrally at the front of the body of the wearer; the leg straps 33ª and 34ª being slipped respectively through the openings of the forward loops 30 and 31 respectively and the connector parts at the ends of said leg straps being detachably connected to their respective detents of the release mechanism C. The latter so far as release and attachment are concerned is operated in a manner identical with the release mechanisms set forth in the co-pending application above mentioned, and U. S. Patent #1,842,611 above referred to.

Various changes in the shape, size, and arrangement of parts may be made to the forms of invention herein shown and described, without departing from the spirit of the invention or the scope of the claims.

I claim:

1. In a parachute harness the combination of a U-shaped sling in which a rider sits as in a swing during descent, means on the lower portion of the sling to engage the lower part of the body of a wearer during descent in a releasable manner, back straps connected at their upper ends in fixed manner upon the riser portions of the sling, breast straps connected upon the riser portions of the sling, means to releasably connect the breast straps together at the front of the wearer, and adapters slidable longitudinally along the riser portions and breast and back straps for simultaneous adjustment of the effective lengths of the back and breast straps respectively associated therewith.

2. In a parachute harness the combination of a flexible webbing sling, diagonal crossing back straps secured fixedly to the sling adjacent to a wearer's shoulders and extending downwardly in diagonally crossing relation and having longitudinally slidable slip loop connections on the sling at opposite sides of the seat of the sling, strap means secured to the sling having slidable release connections with the lower ends of said diagonal back straps adjacent to where the latter have their slip loop connections upon the sling to define leg receiving loop openings therewith, breast straps secured to the opposite sides of the sling, release connections for securing the breast straps together at the front of a wearer, and single adapter means on each side of the sling for simultaneously adjusting the effective lengths of the back and breast straps attached to that side of the sling.

3. In a parachute harness the combination of a flexible sling webbing including a seat portion and upstanding riser portions, means stiffening each riser portion for a certain length thereof adjacent to the seat portion of the sling, and other body attaching strap means secured to the sling including slip loop connections upon the stiffened portions of the side riser portions of the sling and slidable therealong.

4. In a parachute harness the combination of a sling in which a wearer sits as in a swing during a parachute descent including a seat portion and upstanding side riser portions, back straps connected with said riser portions and having connection at their lower ends with the side riser portions adjacent to the seat portion and being looped forwardly adjacent said connections, leg straps connected with said sling threaded through said loops and extended at their ends to the front of the wearer, and a quick release connector device connecting said ends together.

5. In a parachute harness the combination of a sling in which a wearer sits as in a swing during a parachute descent including a seat portion and upstanding side riser portions, back straps connected with said riser portions and having connection at their lower ends with the side riser portions adjacent to the seat portion and being looped forwardly adjacent said connections, leg straps connected with said sling and threaded through said loops and extended at their ends to the front of the wearer, other strap means secured to the side riser portions of the harness at the upper part of the body of a wearer having ends extending to the front of the wearer, and a quick release connector device connecting all of said ends together.

6. In a parachute harness the combination of a flexible U-shaped sling in which a rider sits as in a swing during descent including a seat portion and upstanding flexible riser portions, back straps connected with the upper portions of the side riser portions and extending therefrom in crossing relation and extending at the outer sides of the riser portions and having slip connections slidable along the said riser portions adjacent to the seat portion, the same being looped forwardly adjacent to said slip connections to provide side loops, leg attaching straps secured to the seat portion and having ends to be slid through said side loops to provide leg encircling loops with the ends of the leg straps extending to the front of the wearer, and a quick release connector device for securing said ends of the leg straps in releasable manner upon the harness.

7. In a parachute harness the combination of a flexible U-shaped sling in which a rider sits as in a swing during descent including a seat portion and upstanding flexible riser portions, back straps connected with the upper portions of the side riser portions and extending therefrom in crossing relation and looped forwardly at the outer sides of the riser portions and having slip connections at their ends slidable along the said side riser portions, leg attaching straps secured to the seat portion and having ends releasably slid through said loops to define leg encircling loops with the ends of the leg straps extending to the front of the wearer, breast straps secured to the side riser portions of the sling having coupling parts, and a quick release connector device for securing said ends of the leg straps and the coupling parts of the breast straps in releasable manner upon the harness.

8. In a parachute harness the combination of a flexible U-shaped sling in which a rider sits as in a swing during descent including a seat portion and upstanding flexible riser portions, back straps connected with the upper portions of the side riser portions and extending therefrom in crossing relation and being forwardly looped to the outer sides of the riser portions and having slip connections slidable along the said side riser portions adjacent to the seat portion, leg attaching straps secured to the seat portion and having ends releasably slid through said loops to define leg encircling loops with the ends of the leg straps extending to the front of the wearer, breast straps secured to the side riser portions of the sling having coupling parts, a quick release connector device for securing said ends of the leg straps and coupling parts of the breast straps in releasable manner upon the harness, and adapters slidable on each of the side riser portions having slidable connection with the back and breast straps respectively connected to said side riser portions for adjusting the effective lengths thereof.

9. In a parachute harness the combination of riser webs, means for connecting the riser webs to the lower portion of the body, back straps having fixed connections at their upper ends upon the riser webs, breast straps having fixed connection on the riser webs, and a single adapter on each riser web slidable therealong and having the upper ends of the breast and back straps looped therethrough for simultaneously adjusting the effective lengths of the back and breast straps on the respective riser webs.

10. In a quick release aviator's harness the combination of a U-shaped supporting sling in which the aviator sits including side riser webs, independent breast straps connected with the riser webs and extending therefrom to the front of the wearer, back strap means connected with the riser webs, a pair of relatively independent leg straps connected with the sling in position to extend between the legs of the aviator and upwardly to the front of the aviator, a quick release fastening detachably connecting together the meeting ends of the breast and leg straps, and strap means connected with the riser webs and releasably connectible with the adjacent leg straps to provide therewith leg receiving openings.

11. In an aviator's harness the combination of a U-shaped sling in which a wearer sits as in a swing including a seat portion and side riser portions, body attaching straps connected with said sling including looped portions having connection with each of the riser portions adjacent to the seat portion, relatively independent leg straps adapted to be releasably extended upwardly between the legs of a wearer and located upon said swing in position for releasable threading through the respective loop portions adjacent thereto to provide leg openings therewith, and a quick release connector device releasably connecting the ends of said leg straps together and upon the harness.

12. In a quick release aviator's harness the combination of a U-shaped supporting sling in which the wearer sits as in a swing and including a seat portion and side riser webs, a pair of leg straps connected with the sling and in position to extend between the legs of the wearer to the front of the wearer, strap means connected with each of the side riser webs adjacent to the seat portion and having loops through which the leg straps are releasably threaded, and a quick release fastening to releasably hold the straps in said association upon the wearer.

13. In a quick release aviator's harness the combination of a U-shaped supporting sling including a seat portion and side riser portions, upper body straps connected with the side riser portions, a pair of relatively independent leg straps connected with the sling seat and in position to extend between the legs of the wearer to the front of the wearer, strap means connected with each of the side riser webs adjacent to the seat portion and having loops through which the adjacent leg straps are releasably threaded, and a quick release fastening to releasably hold the said leg straps and the upper body straps in releasable association upon the wearer.

14. In a parachute harness the combination of a U-shaped sling in which the wearer sits as in a swing during a parachute descent, including a seat portion and flexible riser portions, back straps connected with the riser portions in the vicinity of the shoulders of a wearer of the harness having their lower portions slidably connected upon said riser portions against transverse sliding thereon and for free longitudinal sliding respectively therealong, said slidable connections being located adjacent to the seat portion and relatively at opposite sides of the seat portion so that the distance along the seat portion between said slidable connections may be varied without varying the actual lengths of said back straps between the said slidable connections and their shoulder connections with the riser portions, and other body straps connected with said sling including leg straps having interconnection with the back straps adjacent to their said slidable connections upon said riser portions.

15. In a quick release aviator's harness the combination of a U-shaped supporting sling including a seat portion and side riser portions, upper body straps connected with the side riser portions, a pair of relatively independent leg straps connected with the sling seat and in position to extend between the legs of the wearer to the front of the wearer, strap means connected with the side riser portions and on each side riser portion adjacent to the seat portion having extensible loops through which the adjacent leg straps are adapted to be releasably threaded to provide leg receiving openings, and a quick release fastening to releasably hold the said leg straps and the upper body straps in releasably associated relation upon the wearer.

16. In a quick release aviator's harness the combination of a U-shaped supporting sling including a seat portion and side riser portions, upper body straps connected with the side riser portions, a pair of relatively independent leg straps connected with the sling seat and in position to extend between the legs of the wearer to the front of the wearer, strap means connected with the side riser portions and on each side riser portion adjacent to the seat portion having extensible loops each provided with connections slidable longitudinally along the respective side riser portions and through which loops the adjacent leg straps are adapted to be releasably threaded to provide leg receiving openings, and a quick release fastening to releasably hold the said leg straps and upper body straps in releasably associated relation upon the wearer.

17. In a parachute harness the combination of a sling in which a wearer sits as in a swing during a parachute descent including a seat portion and upstanding side riser portions, back straps connected with the upper portions of said riser portions crossing at the back and having their lower ends provided with connections upon the side riser portions adjacent to the seat portions, said back straps being looped forwardly adjacent said lower end connections upon the riser portions, leg straps connected with said sling and having releasable slidable connection with said loops and extended at their free ends to the front of the wearer, other strap means secured to the side riser portions of the harness at the upper part of the body of a wearer and having ends extending to the front of the wearer, and a quick release connector device connecting all of said ends of the last mentioned strap means and leg straps together.

18. In a parachute harness the combination of a U-shaped supporting sling in which a wearer sits as in a swing during a parachute descent including a seat portion and side riser portions, leg straps connected with the seat portion of the sling and extensible upwardly between the legs and around the legs, back straps connected with the upper portions of the riser portions of the U-shaped sling crossing diagonally and at their lower ends having connections upon the respectively adjacent riser portions for unrestricted longitudinal sliding along said respective riser portions between the seat portion and the waist of a wearer, said leg straps having releasable interconnection with said back straps and slidable therealong adjacent to said slidable connections of said back straps along the riser portions.

HAROLD G. ROGERS.